Patented Oct. 16, 1934

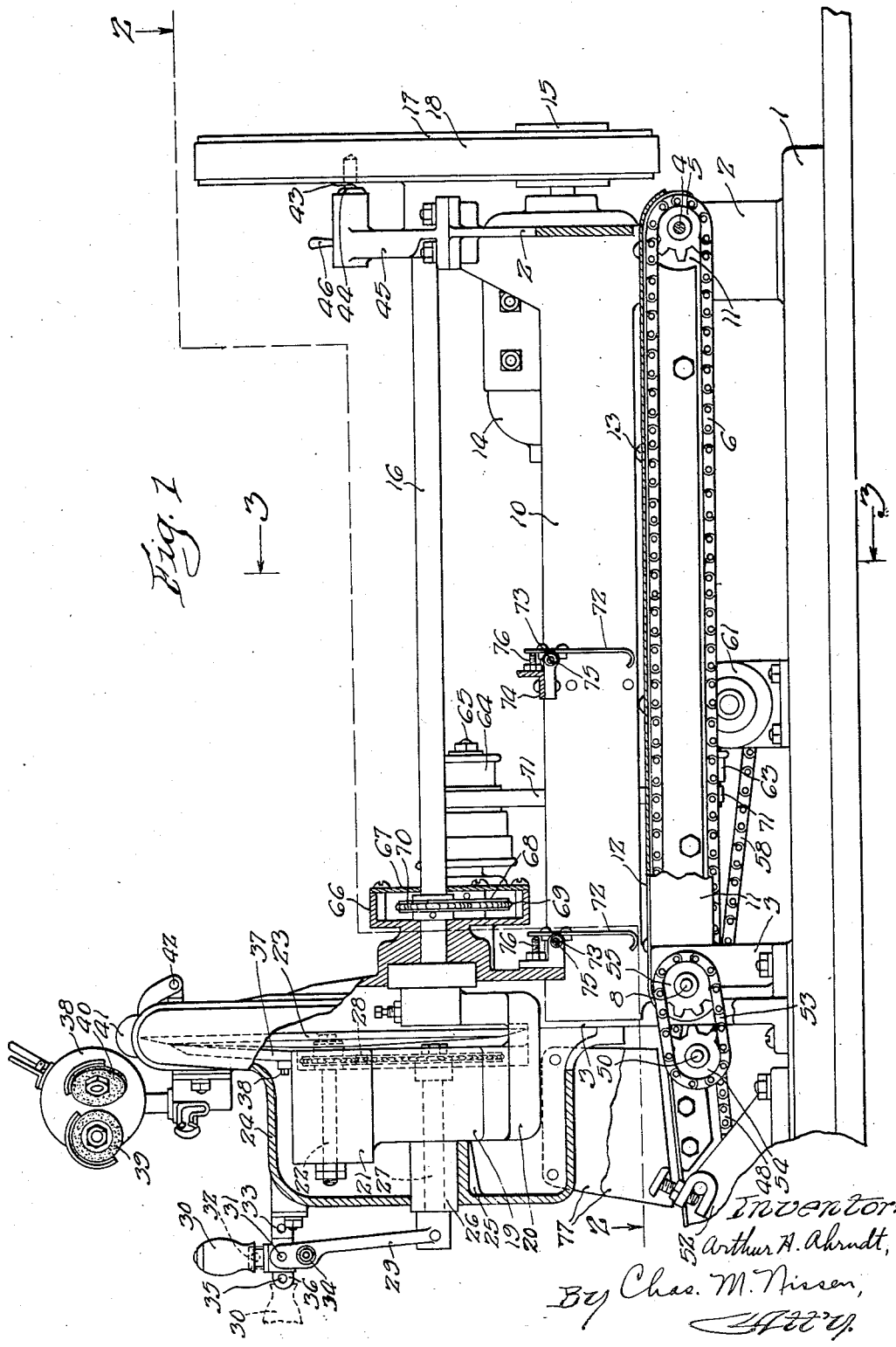

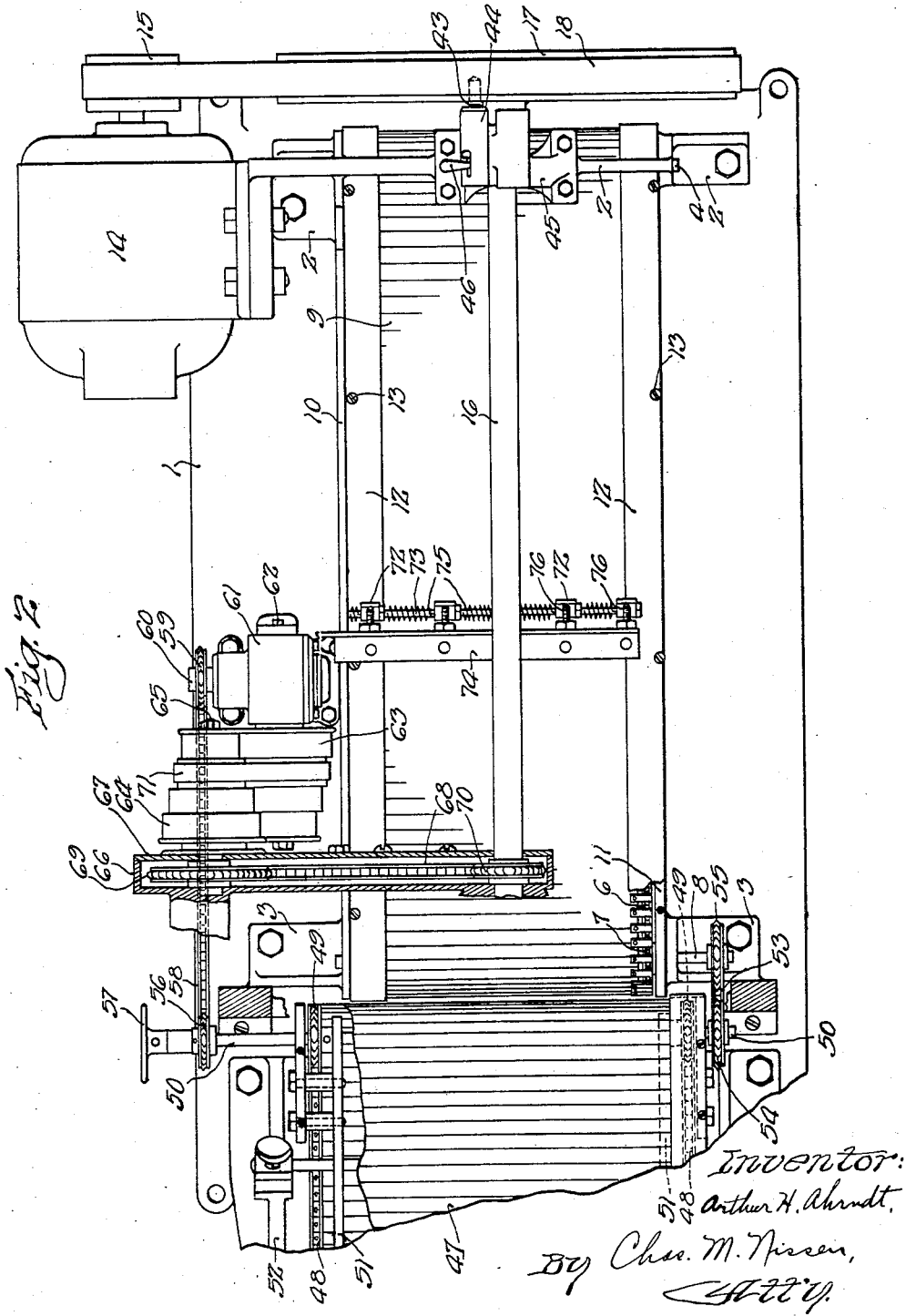

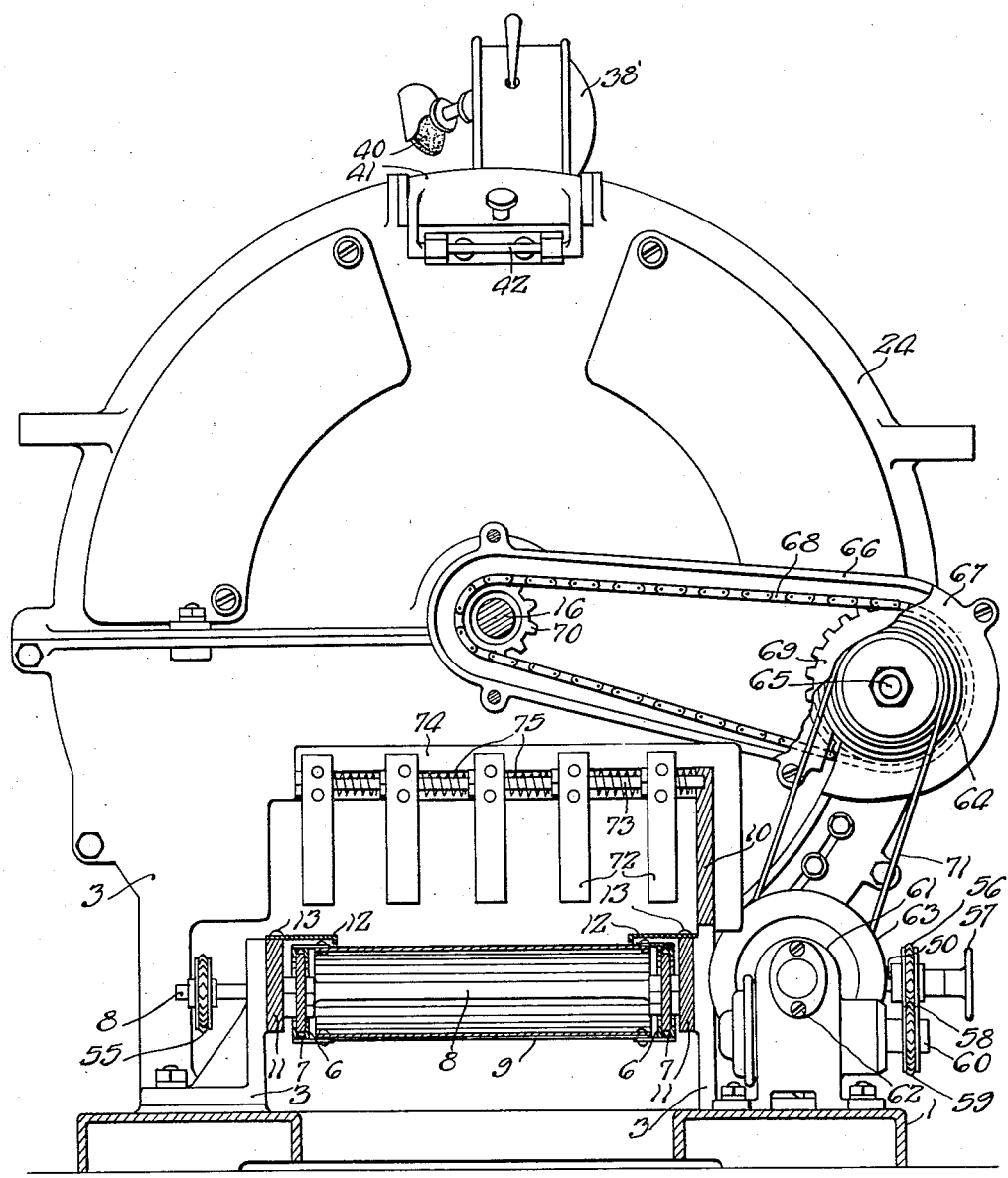

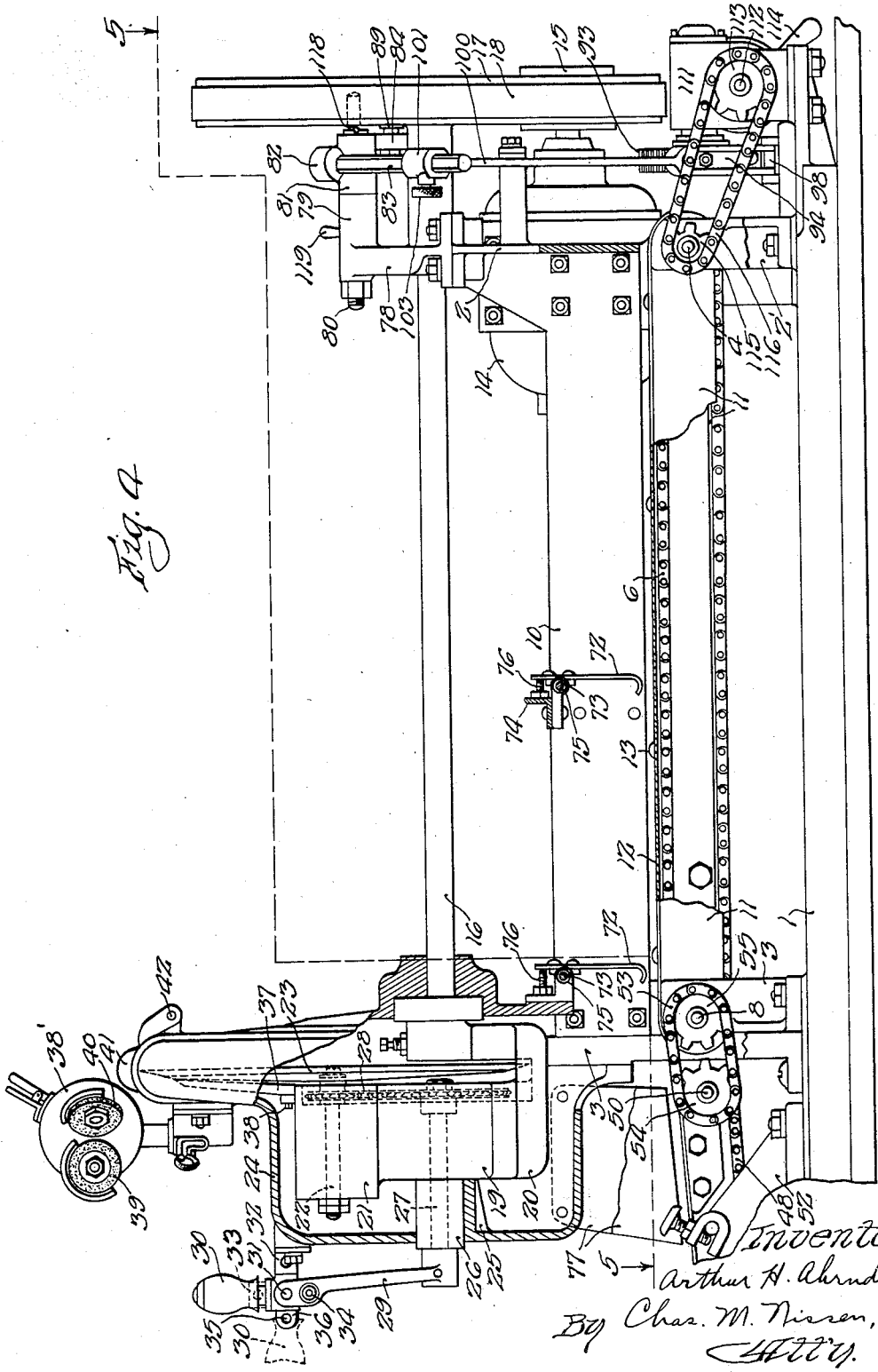

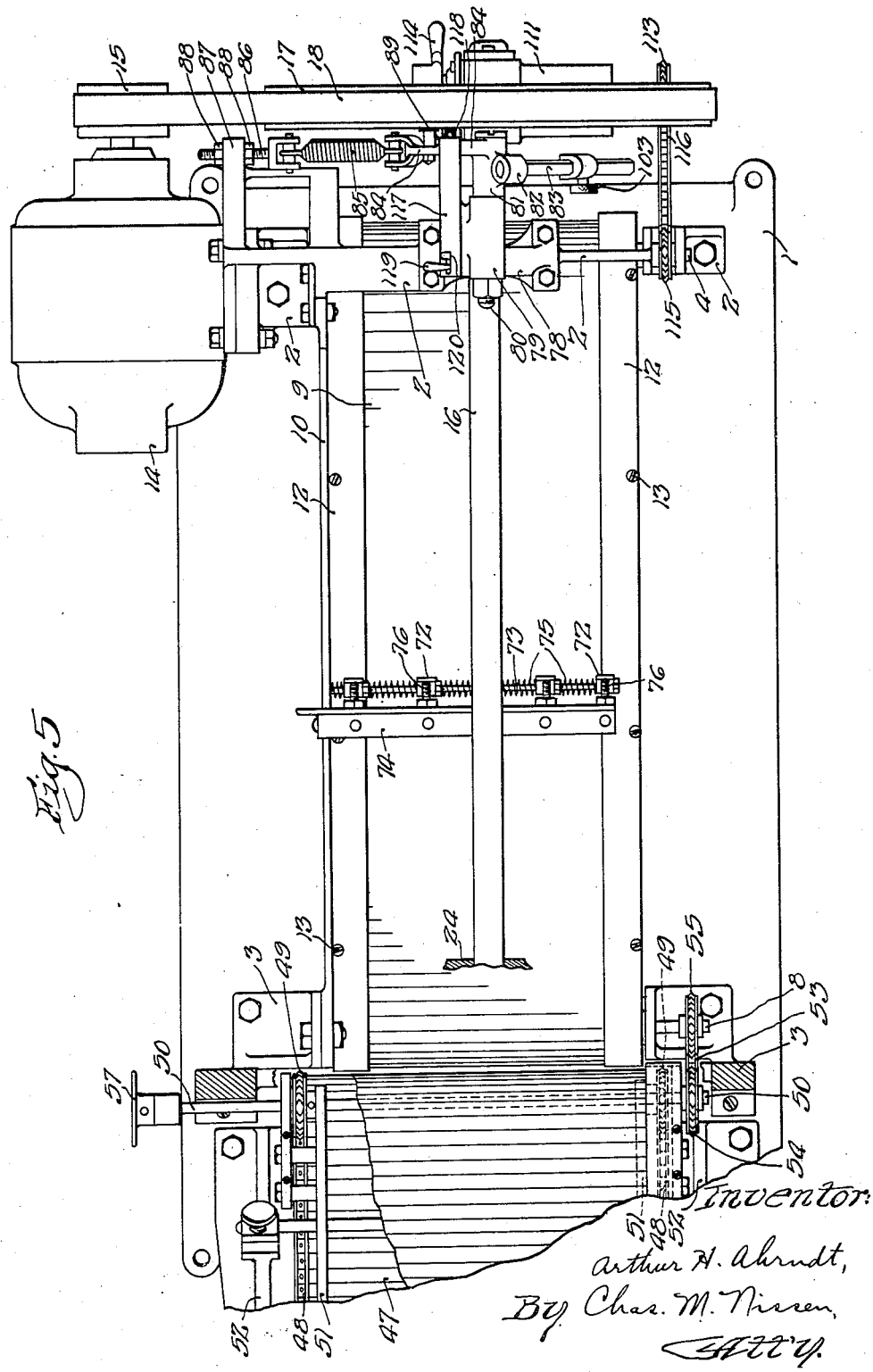

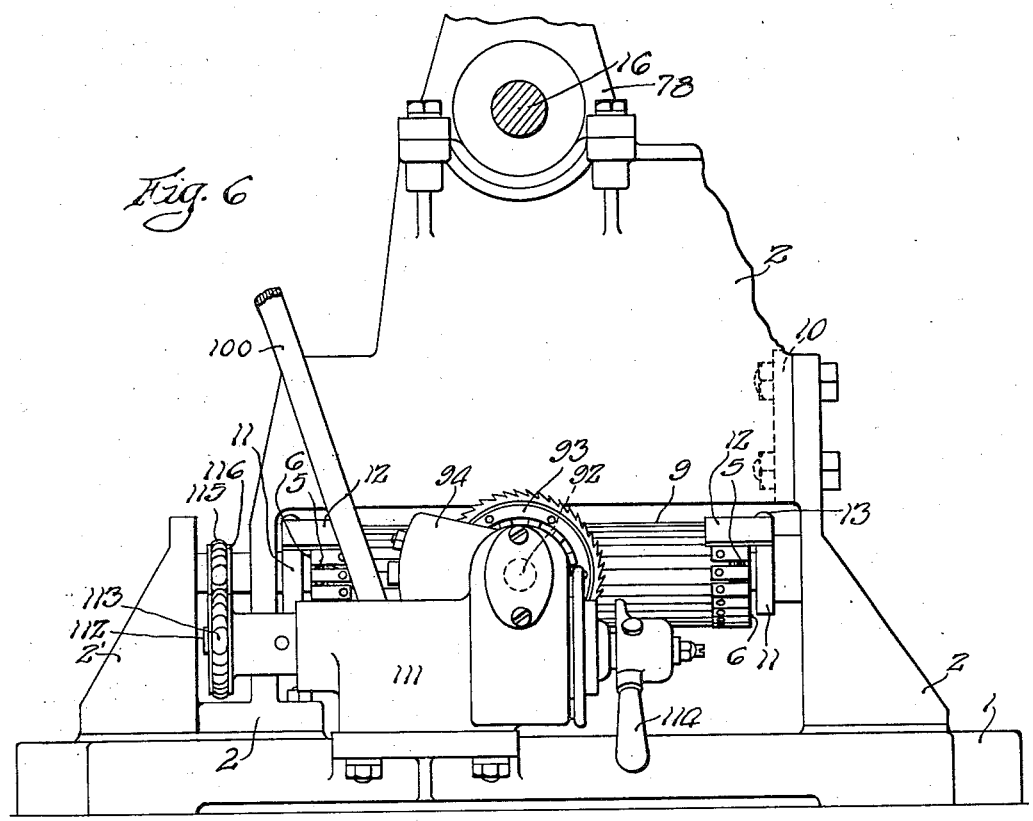

1,976,826

UNITED STATES PATENT OFFICE 1,976,826

BACON SLICING MACHINE

Arthur H. Ahrndt, La Porte, Ind., assignor to U. S. Slicing Machine Company, La Porte, Ind., a corporation of Indiana Application February 27, 1930, Serial No. 431,706

13 Claims. (Cl. 146—101)

The present invention relates to slicing machines designed more particularly for the rapid slicing of bacon, but it will be understood that the machine described is capable of being used for cutting other substances without departing from the spirit of the invention.

In general, the machine is of the type shown in my prior application Serial No. 418,835 filed January 6, 1930. In the machine described in that application, independent drives are used for driving the substance carrier and the slice receiver or stacker. My present invention however, has for one of its objects the provision of a single driving means for driving the conveyer which conveys the substance towards the slicing knife as well as the conveyer which conveys the slices away from the slicing knife after they are cut from the substance by means of the knife.

Another object of this invention is to provide means for driving two endless conveyers arranged on opposite sides of the cutting plane of the knife in timed relation with each other, although not necessarily at the same speed. However, the relation is such that when one conveyer is moved, the other conveyer moves also.

Another object of this invention is the provision of a machine in which the substance to be sliced is moved continuously towards the cutting plane of the knife during the rotation of the knife and the severance of slices from the substance being sliced, and at the same time moving the conveyer for the slices continuously in one direction on the other side of the cutting plane of the knife.

Another object of my invention is to provide means for driving both the substance conveyer and the slice conveyer intermittently.

More specifically my invention has for its object the reduction of the number of driving instrumentalities necessary for the efficient operation of my machine and to so speed up the slicing action as to increase the capacity of the machine.

In the drawings—

Fig. 1 represents a front view of a machine embodying my invention with certain of the parts thereof in cross-section so as to more clearly show the details thereof.

Fig. 2 is a section taken approximately on the line 2—2 of Fig. 1;

Fig. 3 is a section taken substantially along the line 3—3 of Fig. 1;

Fig. 4 is an elevational view of a modification of the device shown in Figs. 1 to 3, inclusive, and is a view similar to Fig. 1;

Fig. 5 is a plan view taken substantially along the line 5—5 of Fig. 4;

Fig. 6 is a fragmentary end view of the right hand end of the device shown in Fig. 4; and Fig. 7 is a detailed view showing the arrangement of the feed mechanism for feeding the substance support and slice receiver intermittently.

Referring now more particularly to Figs. 1, 2 and 3; 1 represents the base of the machine and this base supports the upstanding brackets 2 and 3. The end brackets 2 and 3 support the main parts of the slicing machine. The bracket 2 has rotatably journaled therein a shaft 4 carrying a sprocket wheel 5. This sprocket wheel is adapted to have the chain 6 trained thereover. The other end of the conveyer chain 6 is trained over a sprocket 7 secured to the shaft 8 journaled in the bracket 3. Similar sprockets are arranged at the opposite ends of the shafts 4 and 8 and support another chain in spaced parallel relation with the chain 6. Slats 9 are supported between the opposed runs of the chains and provide the necessary supporting surface for a substance which is to be sliced.

A guide plate 10 extends along the rear edge of the conveyer and acts as a means for guiding the substance as it is conveyed towards the slicing knife by the conveyer. Conveyer chains 6 are protected on the sides by means of guide plates 11, and on the top by means of guide plates 12 secured to the guide plates 11 by suitable screws 13. The details of the conveyor mechanism are more clearly described in my aforementioned co-pending application Serial No. 418,835. It will be understood that the conveyer is arranged so as to have the upper surface thereof form a gripping surface for gripping the underside of the substance and for forcing it in the direction of the slicing knife and may be formed in either of the ways described in my co-pending application Serial No. 418,835.

On the rear side of the bracket 2 I secure a motor 14 which has a driving pulley 15 arranged on one end of the motor shaft, it being understood that if desired I may provide an adjustment for the motor. The brackets 2 and 3 also rotatably support the shaft 16 which carries the fly-wheel 17 on one end thereof, this fly-wheel being in alinement with the pulley 15. A belt 18 is trained over the pulley 15 and fly-wheel 17, and it will be seen that when the motor is rotated, the shaft 16 will likewise be rotated although at a speed which is slower than the speed of rotation of the motor.

The shaft 16 carries on the left hand end thereof (Fig. 1) a U-shaped member 19 which has a counterbalance portion 20 for a purpose which will appear presently. The U-shaped member 19 has an offset portion 21 in which is rotatably mounted a spindle 22 which has a knife 23 secured to the right hand end thereof. The spindle 22 is free to rotate within suitable bearings in the offset portion 21. A casing 24 is supported on the bracket 3 and substantially encloses the U-shaped member 19 and the knife 23. This casing has a bearing bracket 25 which supports a bearing sleeve 26 and this latter in turn supports a rotatable spindle 27 which extends through the sleeve and through the one leg of the U-shaped member 19 as indicated in dotted lines, and which is more fully described in my application Serial No. 418,835.

A chain 28 is trained over suitable sprockets on the spindle 22 and the shaft 27 respectively. An arm 29 is secured to the shaft 27 and has a handle portion 30 pivoted thereto at 31. The handle 30 has a lug 32 adapted to co-operate with a pair of spaced lugs 33 to lock the arm 29 in fixed position when the handle is in the full line position shown in Fig. 1. When the handle is in the dotted line position shown in Fig. 1, the pin 34 which extends through the arm 29 co-operates with the opening 35 in a lug 36 rigid with the handle and locks the handle in the dotted line position, at the same time releasing the lug 32 from the lugs 33.

A deflector 37 is secured at 38 to the offset portion 21 and lies in close proximity to the surface of the knife and is for the purpose of deflecting the slices after they have been cut by the knife.

The casing 24 also carries a sharpening device 38' having the grinding wheels 39 and 40 for sharpening the knife 23 after the cover 41 on the casing is thrown into open position about its pivot 42 in the manner more clearly described in my co-pending application No. 332,-790 filed January 16, 1929, and the application of William Mahler, Serial No. 332,525 filed January 14, 1929. When it is desired to sharpen the knife, the grinders are brought into engagement with the opposite sides of the cutting edge of the knife and the handle 30 is released from its locked position and is used to turn the arm 29 and thereby rotate the shaft 27. This rotation of the shaft 27 rotates the knife 23 by means of the chain 28 and the sprockets on the spindle 22 and shaft 27. During the sharpening operation the fly-wheel and consequently the shaft 16 and member 19 are held in fixed position by means of a sliding bolt 43 slidable in the bracket 44 integral with the bearing cap 45 and operable by means of an operating handle 46. The bolt 43 enters a suitable opening in the fly-wheel 17 and prevents the rotation of the fly-wheel. When it is desired to use the knife for cutting purposes, the bolt 43 is withdrawn and the lug 32 is placed in position so as to engage between the lugs 33 and hold the arm 29 in fixed position. This holds the sprocket on the shaft 27 in fixed position and when the motor 14 drives the fly-wheel 17 the shaft 16 rotates and carries with it the U-shaped member 19. This movement rotates the offset portion 21 in a circle about the axis of the shaft 27 (or 16).

Since the sprocket on the shaft 27 is stationary, the chain 28 exerts a pull on the sprocket on spindle 22, thus causing the spindle 22 to rotate about its axis in a direction opposite to the direction of rotation of the offset portion 21.

A second conveyer having the slats 47 carried by means of chain 48 supported on suitable sprockets 49 shown in Figs. 1 and 2 and a similar set of sprockets arranged on a shaft parallel to the shaft 50 which supports the sprockets 49, supports the other end of the endless conveyer in the same manner as do the sprockets 49 which are illustrated in the drawings. This conveyer is more clearly shown in my co-pending application Serial No. 332,-790 referred to previously. The conveyer just described has the parallel plates 51 which rotatably support the shaft 50 and the shaft (not shown) which supports the other set of sprockets and over which the chains 48 are trained. Brackets 52 co-operate with the slats 51 to hold the conveyer in predetermined relation to the cutting plane of the slicing knife. This is also shown in my co-pending application Serial No. 332,790.

In all of the co-pending applications previously referred to, the conveyers on the opposite sides of the cutting plane of the knife are independently operable and the substance supporting conveyer is preferably adapted to be driven intermittently during the cutting operation while the conveyer for supporting the slices is adapted to be driven continuously during the slicing operation. In my present invention however, I contemplate driving the two conveyers by the same instrumentality. For this purpose I connect the two conveyers by means of a chain 53 trained over suitable sprockets 54 and 55 on the shafts 50 and 8, respectively. This causes both of the conveyers to move whenever one of the conveyers is actuated. It will be understood of course, that the proportions of the gears 54 and 55 may be altered to give the proper relative speeds to the conveyer or I may desire to use a set of step-cone pulleys or like change speed mechanism between the shafts 8 and 50. The shaft 50 also carries a sprocket 56 at the rear side of the machine and a handle 57, which latter may be manually operated to rotate the shaft 50. In order to do this, applicant provides a shaft 20 provided with a clutch such as shown in my co-pending application, Serial No. 332,790, filed January 16, 1929. The sprocket 56 however, has a chain 58 trained thereover and over a sprocket 59 on the shaft 60 of a change speed mechanism 61. The change speed mechanism 61 has a shaft 62 arranged at right angles to the shaft 60, and this shaft 62 carries a step-cone pulley 63 arranged in alined relation with the step-cone pulley 64 mounted on the shaft 65 rotatably mounted in the auxiliary casing 66 carried by the casing 24. The casing 66 has a cover plate 67 thereover, and encloses a chain 68 trained over a sprocket 69 on the shaft 65 and another sprocket 70 secured to the shaft 16. The casing 66 has a portion thereof surrounding shaft 16, thus utilizing the shaft 16 as a bearing support therefor. Thus it will be seen that when the shaft 16 is rotated by means of the motor 14, the shaft 50 will be rotated through means of the chain 68, belt 71 (trained over the step-cone pulleys 63 and 64) change speed gearing 61 and chain 58 trained over sprockets 59 and 56. The rotation of the shaft 50 rotates the shaft 8 by means of the chain 53 trained over the sprockets 54 and 55 and this in turn causes the conveyer for the substance to be moved in unison with the conveyer for the slices.

In order to hold the substance on the supporting surface of the substance conveyer, I provide the spring clips 72 pivoted at 73 to a bracket 74 secured to the guide plate 10. Springs 75 secured at one end to the pivot 73 and at the other to separate ones of the clips 72, normally tend to rotate the clips in a counter-clockwise direction as viewed in Fig. 1. Counter-clockwise rotation is limited however by means of the stops 76, but these stops permit the clockwise rotation of the clips 72 when the substance is moved thereagainst as the conveyer moves towards the cutting plane of the knife. These clips 72 hold the substance firmly on the supporting surface of the conveyer and cause the substance engaging means thereon to firmly engage the substance and convey it towards the slicing knife. It will be noted that there are two sets of spring clips 72 for holding the substance at spaced points along its path of movement.

With the parts in the position shown in Fig. 1 the motor is started and the shaft 16 is rotated to thereby rotate the member 19 and offset portion 21. This rotation of the offset portion 21 causes the knife to rotate in the manner previously described and since the deflector is carried bodily by the movement of the offset portion 21 it has an opposite direction of movement relative to the substance being sliced to the direction of rotation of the knife about its own axis. The effect of the movement of the knife through the substance and the movement of the deflector on the slice as it is cut tend to neutralize each other and cause the slices to be thrown onto the slice conveyer in a direction substantially at right angles to the cutting plane of the knife. Each successive slice is also thrown in this manner and is stacked on the previous slice broadside down to form a uniform overlapping of the slices on the conveyer. A shield 77 is arranged to the left of the cutting plane of the knife as viewed in Fig. 1 and to the rear of the conveyer for the slices to prevent any slices from being thrown to the rear of the machine. This is only a safeguard however, as normally these slices are not deflected towards the rear of the machine but only in a direction substantially perpendicular to the cutting plane of the knife.

It will be noted that with a device such as shown in Figs. 1 to 3, inclusive, both the conveyer for the substance and the conveyer for the slices are moved continuously in one direction and there is feeding of the substance even during the cutting of the slices therefrom by the knife, but due to the rapidity with which these slices are cut, and due to the relatively thin slices which are normally cut by such a machine the fact that feeding of the substance occurs during the slicing of the substance does not materially affect the operation of the device. True perhaps the slices are cut at a slight inclination to the cutting plane of the knife but this is not noticeable in the finished product. The advantages of a continuous feed are that the machine operates with less jarring and noise and also causes less wear and tear on the various parts. It also does away with the necessity of providing intermittent feeding means for the substance conveyer which normally has been considered essential to the proper operation of a slicing machine.

By means of the step-cone pulleys 63 and 64, one is enabled to give varying speeds to the conveyers, but it will be understood of course, that the step-cone pulleys are merely illustrative of a change speed mechanism and any other form of change speed mechanism may be substituted for the step-cone pulleys if desired.

In the modification shown in Figs. 4, 5, 6 and 7, reference numerals which correspond to the reference numerals in Figs. 1, 2 and 3 indicate corresponding parts.

In this modification the continuous drive to the conveyer is omitted and in place thereof I have illustrated an intermittent drive for feeding both of the conveyers. I also show an additional bracket 2' to support the shaft 4.

Referring more particularly to Fig. 4, the numeral 78 represents a bearing cap which is designed to take the place of the bearing cap 45 shown in Fig. 1. This bearing cap 78 is supported on the bracket 2 and has a bearing 79 integral therewith for supporting the bolt 80 which has a sleeve 81 rotatably supported thereon. The sleeve 81 carries an offset portion 82 adapted to receive and firmly hold the rod 83. The sleeve 81 also has an arm 84 connected by means of a spring 85 to a screw 86 adjustably held in place in the lug 87 on the bracket 2 by means of the lock nuts 88. The spring 85 normally rotates the arm 83 in a counterclockwise direction as viewed in Fig. 7. The arm 84 also carries a cam roller 89 adapted to cooperate with the cam surface 90 arranged within the hub portion 91 of the fly-wheel 17 and is adapted to rock the arm 83 in a clockwise direction against the action of the spring 85.

Directly below the shaft 16 is located a shaft 92 which carries a ratchet wheel 93. A sector plate 94 pivoted on the shaft 92 carries a pawl 95 pivoted thereto at 96 and yieldingly held in engagement with the teeth on the ratchet wheel by means of a spring 97. An extension 98 on the pawl is pivoted at 99 to the link 100, which in turn is pivoted to the sliding block 101 at 102. The sliding block 101 is adapted to be adjustably secured at a desired position along the rod 83 by means of a thumb screw 103. By this arrangement it will be seen that since the extent of movement of the rod 83 is constant, the position of the sliding block 101 on the rod 83 will determine the amount of movement given to the link 100, and consequently the amount of movement which will be given to the sector plate 94 and pawl 95. The amount of movement given to the pawl 95 determines the amount of rotation given to the ratchet wheel 93. In order to prevent over-running of the ratchet 93, I provide a braking means for normally holding the ratchet wheel stationary but which will permit the ratchet wheel to be moved under the force exerted thereon by the pawl 95. This means comprises a brake drum 104 thereto and surrounds this brake drum by a brake band 105 having one end thereof pivoted at 106 to a bracket 107 and having the other end thereof secured to a bolt 108 which extends through the bracket 107 and is surrounded by a spring 109 interposed between the bracket 107 and the lock nuts 110. The spring 109 exerts a pull on the bolt 108 and tightens the band 105 against brake drum 104, thus retarding the movement of the ratchet wheel 93, and tending always to hold the ratchet wheel against accidental displacement or against excessive or retrograde movement. It is just as essential to prevent reverse rotation of the ratchet wheel when the pawl 95 rotates in a counter-clockwise direction (Fig. 7) as it is to prevent over-running of the ratchet wheel on the clockwise rotation thereof. This feeding means insures an accurate feed for rotating the shaft 92, which through mechanism which will presently be described feeds the conveyer which supports the substance and also the slices.

The shaft 92 is connected by means of a worm and worm wheel connection within the casing 111 to a shaft 112, to which is secured a sprocket 113. A clutch (not shown) is arranged within the casing 111 concentric with the shaft 112, and is operated by means of a handle 114 so as to connect and disconnect the drive from the shaft 92 to the shaft 112. This mechanism is clearly shown in each of my co-pending applications which have been previously referred to, and it is thought that no further explanation of this mechanism is necessary in this application as no invention is being claimed in the construction of the clutch. It is only essential to point out that the casing 111 encloses the driving connections between the shafts 92 and 112, and that the clutch mechanism is also arranged within the casing 111 to connect and disconnect the drive from the shaft 92 to the shaft 112.

The shaft 4 which carries the sprocket 5 also carries a sprocket 115, and a chain 116 trained over the sprockets 113 and 115 forms an operative driving means for driving the shaft 4 from the shaft 112. Rotation of the shaft 4 moves the chain 6 by means of the sprocket 5. This movement of the chain 6 imparts movement to the substance in a direction towards the slicing knife 23 which is operated in precisely the same manner as described with reference to the embodiment shown in Figs. 1 to 3, inclusive. Since the two conveyers are operatively connected by means of the chain 53, it will be seen that when the substance conveyer is actuated, the slice conveyer will also be actuated and the direction of movement of both conveyers will be the same.

By means of the mechanism which has been described it will be seen that since an intermittent movement is imparted to the shaft 92 by means of the pawl and ratchet wheel, that the conveyer will also be operated intermittently and that the amount of movement given to the conveyer will be determined by the amount of rotative movement imparted to the shaft 92 at each complete cycle of operation of the feeding mechanism.

The advantages of the modification shown in Figs. 4, 5, 6 and 7 are that a very good regulation of feed mechanism may be obtained and one can thereby regulate very readily the thickness of the slices which are being cut. With this type of feed mechanism very small increments of feed may be obtained, but if smaller increments are required, I may substitute for the pawl and ratchet wheel a free-wheel connection between the link 100 and the shaft 92. Such a free-wheel connection is well known in the art to which this invention pertains as exemplified in Stukart, No. 1,645,551 granted October 18, 1927, and may be substituted bodily for the pawl and ratchet mechanism illustrated in the drawings. No matter how fast the feed mechanism is operated the brake band 105 insures the proper actuation of the ratchet wheel 93 and consequently the proper feed which is imparted to the conveyer.

In the embodiment shown in Figs. 4 to 7, inclusive, the slicing knife moves in exactly the same manner as in Figs. 1 to 3, and the deflector 37 deflects the slices onto the slice conveyer where the same are stacked and moved away from the cutting plane of the knife the same as in the embodiment shown in Figs. 1 to 3, inclusive.

The bearing cap 78 is also provided with a tubular bearing portion 117, which carries a sliding bolt 118 operated by means of an arm 119 projecting therefrom through a slot 120 in the bearing portion 117. The sliding bolt 118 is adapted to co-operate with a suitable opening in the hub 91 of the fly-wheel 17 in a manner similar to that described with reference to Figs. 1 to 3, inclusive, and more fully described in the aforementioned co-pending applications. This bolt 118 is used to lock the fly-wheel in a position such that the slicing knife 22 will be in its upper position where it may be readily sharpened by means of the sharpening device 38 and in the manner described with reference to Figs. 1 to 3, inclusive.

The thickness of the slices in the modification shown in Figs. 1 to 3, inclusive, is determined by means of the step-cone pulleys 63 and 64, and while such an arrangement does not give a wide variety of feeding movements, it will be understood that in the place of the step-cone pulleys I may substitute true cone pulleys in spaced parallel relation with each other but with their large and small portions arranged oppositely with a belt trained over these cone pulleys. With such an arrangement, small increments of feed may be obtained and thereby the thickness of the slices may be accurately and quickly determined. Cone feed mechanism of the type shown and of the type just described are common expedients for varying the drive between two shafts and the substitution of the one for the other would be clearly within the skill of one who is well versed in the art to which this invention pertains. If desired, I may provide other forms of change speed mechanism between the driving shaft 16 and the driven shaft 50.

The reciprocating knives cannot be moved to and from slicing position as rapidly as can a knife which is mounted to move bodily in a continuous path such as in the embodiments shown in the drawings. The reciprocating knife necessarily must stop at the end of its movement in one direction before it can begin its movement in the opposite direction. The necessity of overcoming the inertia of the slicing knife in order to reverse its direction, is a considerable amount and in actual practice it is practically impossible to cut slices from a substance at the rate of more than 50 to 75 slices per minute.

With the continuously moving knife, and especially with a knife which rotates about its own axis while rotating about an axis eccentric thereto, there is no inertia effect which has to be overcome, and consequently the knife moves more smoothly and can be moved at a more rapid rate than knives which reciprocate. Machines constructed according to this invention and operating in the largest packing houses in the world, all have the knives thereof rotating about the shaft 16 at a rate of approximately 400 R. P. M. Production is increased approximately 500–600% over what is possible with a reciprocating type of knife.

By having the conveyor moving continuously while the slicing operation is taking place, as well as while the substance is not being sliced I am able to increase the output of this machine and insure that the substance is moved forwardly the proper amount before the substance is first engaged by the cutting edge of the knife.

As the slices are deflected by the deflector 37 they are thrown onto the conveyor 47 which is continuously moving away from the slice receiving position. The conveyor 47 is adapted to receive the slices in overlapping relation with each other. Due to the high speed of the knife, the end slabs which are often smaller in diameter than the other slices cut from the substance, there is a tendency for the end slabs to be thrown farther away from the knife and farther in the direction towards which the slicing knife is bodily movable. However, this is prevented by the continuously moving substance support which is utilized to continuously feed a series of slabs of bacon or the like past the cutting plane of the knife, and the end slab is prevented from being thrown away from the cutting plane by the end piece of the next slab to be sliced and the last slice received on the slice receiver.

Preferably the slices are cut while the meat is at a specified temperature, this temperature being such that the grease in the meat is more or less solidified and does not interfere with the cutting action of the knife, as much as it otherwise would. In practice it has been found that bacon slices readily at about 30° F. As the slices fall onto the conveyor 47 they lie with their broad side down and in overlapping relation with each other, thereby laying out the slices for display purposes.

Since the slices are in overlapping relation with each other, it is very easy to scoop up a group of slices quickly by inserting a scoop under the slices from the side of a line of overlapping slices and moving the scoop toward the opposite side of said line.

While I have illustrated my invention as applied to machines having endless conveyors, it will be readily understood that my invention is not limited to use with slicing machines of this nature, and I do not wish to limit my invention except as set forth in the appended claims.

This machine of course, may be used to slice substances other than meat, as I have found that bread, cheese and other substances which are to be sliced may be very readily sliced by means of the mechanism disclosed, and I therefore do not wish to limit the scope of my invention except as set forth hereinafter in the claims, even though the claims may refer to a bacon slicing machine or a meat slicing machine.

Other slicing machines are shown and described in the copending applications Serial No. 332,525, Serial No. 332,790 and Serial No. 418,835. The broad subject matter of the inventions common to all the applications is claimed in the aforesaid copending application Serial No. 332,525. All of said copending applications are assigned to the present assignee.

Obviously those skilled in the art to which this invention pertains may make various changes in the details and arrangements of parts without departing from the spirit and scope of invention as defined by the claims hereto appended.

Having thus fully described two embodiments of my invention, what I claim and desire to secure by Letters Patent of the United States is:

1. In a slicing machine, the combination with a plurality of conveyors having their upper supporting surfaces moving continuously in one direction and being connected to each other so as to move in unison, a knife rotatable about its own axis and about an axis eccentric thereto adapted to rotate continuously in a closed path and in a plane which is adjacent one end of each of said supporting surfaces to cut slices from a substance mounted on said supporting surface of one of said conveyers, and deposit the slices as they are cut directly onto the supporting surface of the other of said conveyors in overlapping relation to each other.

2. In a slicing machine, the combination with an eccentrically mounted knife rotatable bodily in a path which is substantially circular as well as rotate about its own axis, means for moving said knife along said path, a continuously operated conveyor for moving a substance to be sliced along a predetermined path past the cutting plane of said knife, a slice receiver for receiving the slices as they are formed, and movable away from the slice receiving position after each succeeding slice is deposited thereon to make room for the next slice to be cut by the slicing knife, said second conveyor being directly connected to and driven by means including said first conveyor.

3. In a slicing machine, the combination with a substance supporting conveyor having the supporting surface thereof movable in only one direction, a slicing knife carried by a rotatable element and eccentrically mounted on said rotatable element, means for rotating said element at a relatively high rate of speed, said knife rotating about its own axis as well as the axis of said rotatable element, a second conveyor having the supporting surface thereof arranged in a position to receive slices directly as they are formed by said knife and being movable in a direction away from the cutting plane of said knife at a speed such that the slices will be received in overlapping relation with each other, means associated with said knife for directing the slices onto said second conveyer, with the broad sides facing downwardly, means for driving one of said conveyors continuously, and interconnecting means between said conveyors for driving the other of said conveyors through said driven conveyor when the driven conveyor is driven by said driving means.

4. In a slicing machine, the combination with a substance supporting conveyor having the supporting surface thereof movable in only one direction, a slicing knife carried by a rotatable element and eccentrically mounted on said rotatable element, means for rotating said element at a relatively high speed, said knife rotating about its own axis as well as the axis of said rotatable element, a second conveyor having the supporting surface thereof arranged in a position to receive slices directly as they are formed by said knife and being movable in a direction away from the cutting plane of said knife at a speed such that the slices will be received in overlapping relation with each other, means associated with said knife for directing the slices onto said second conveyer with the broad sides facing downwardly, means for driving one of said conveyors continuously, and interconnecting means between said conveyors for driving the other of said conveyors through said driven conveyor when the driven conveyor is driven by said driving means, said means for driving said driven conveyor continuously comprising an element rotatable in unison with the means which drives said knife and change speed mechanism arranged between said element and said driven conveyor to selectively drive said conveyor at different speeds to cut slices of different thicknesses without changing the rotation of movement of said knife.

5. In a slicing machine, the combination with a knife mounted to rotate about its own axis and about an axis eccentric thereto to bring said knife into slicing relation with a substance to be sliced, means for revolving said knife in one direction only about said eccentric axis, an endless conveyor movable continuously toward the cutting plane of said knife for feeding a plurality of substances successively to said knife without interruption, means for holding the substance against the surface of said conveyor while the same is being fed toward the cutting plane of said knife, a slice receiver having the supporting surface in a position to receive slices as they are formed and movable in a direction away from the slice receiving position so that slices received by said knife are stacked thereon, and means for driving both of said conveyors in unison with each other.

6. In a slicing machine, the combination with a rotatable support, means for driving said support continuously in one direction about its axis of rotation, a knife rotatably mounted on said support and rotatable about an axis eccentric to the axis of rotation of said support, means for driving said knife as said support rotates, an endless conveyor for conveying a substance to be sliced towards the cutting plane of said knife and in a direction substantially perpendicular thereto, an endless conveyor having a portion thereof arranged in position to receive slices as they are formed by said knife and for moving said slices away from the slice receiving position, interconnecting means for driving said conveyors in unison with each other, a single means movable in unison with the rotatable support and actuated by the same means which moves said support, interconnecting means between said single means and one of said conveyors for moving said conveyors in their aforementioned directions, including mechanism for changing the amount which said substance conveyor is moved toward the cutting plane of said knife for each revolution of said support about its axis, said mechanism being continuously driven and adapted to drive said conveyors continuously without interruption in the aforesaid manner.

7. In a slicing machine, the combination with a rotatable support, of means for rotating said support at a high rate of speed, a knife mounted on said support and rotatable about an axis eccentric to the axis of said support, means for rotating said knife about its own axis as said support is rotated about its axis, an endless conveyor having the supporting surface thereof movable continuously and uninterruptedly in a direction towards the cutting plane of said knife, a second endless conveyor having a portion of the supporting surface thereof arranged to receive slices directly as they are formed by said knife and in overlapping relation with each other, said endless conveyor being movable continuously to convey the slices away from the slice receiving position, a positive drive between said conveyors to cause both of said conveyors to move in unison with each other, and change speed mechanism for driving one of said conveyors from the means which rotates said support in order that the feed of the substance support may be changed to cut slices of different thicknesses.

8. A device as claimed in claim 7 in which presser bars are yieldingly mounted in a position to press the substance being fed towards the cutting plane of said knife against the supporting surface of the endless conveyor which supports the substance and at points spaced longitudinally of the feeding movement of said substance conveyor.

9. A slicing machine as claimed in claim 7 in which the cutting edge of the knife moves through the substance being sliced in a direction opposite to the direction in which the same rotates about its own axis.

10. A device as claimed in claim 7 in which said support is provided with a relatively fixed deflector plate thereon which is adapted to engage the slice being cut and deflect the cut onto said slice receiving conveyor, said deflector substantially neutralizing the tangential throwing effect of the knife on the slice being severed.

11. In a slicing machine, the combination with a rotatable support, of means for rotating said support at a speed over 300 R. P. M., a knife mounted on said support and rotatable about an axis eccentric to the axis of said support, means for rotating said knife about its own axis as said support is rotated about its axis, an endless conveyor having the supporting surface thereof movable continuously and uninterruptedly in a direction towards the cutting plane of said knife, a second endless conveyor having a portion of the supporting surface thereof arranged to receive slices directly as they are formed by said knife and in overlapping relation with each other, said endless conveyor being movable continuously to convey the slices away from the slice receiving position, a positive drive between said conveyors to cause both of said conveyors to move in unison with each other, and change speed mechanism for driving one of said conveyors from the means which rotates said support in order that the feed of the substance support may be changed to cut slices of different thickness.

12. In a slicing machine, the combination with a substance supporting conveyer having the supporting surface thereof movable in only one direction, a slicing knife carried by a rotatable element and eccentrically mounted on said rotatable element, means for rotating said element at a speed of over 300 R. P. M., said knife rotating about its own axis as well as the axis of said rotatable element, a second conveyer having the supporting surface thereof arranged in a position to receive slices directly as they are formed by said knife and being movable in a direction away from the cutting plane of said knife so that the slices will be received in overlapping relation with each other, means associated with said knife for directing the slices onto said conveyer, with the broad sides facing downwardly, means for driving one of said conveyers continuously, and interconnecting means between said conveyers for driving the other of said conveyers through said driven conveyer and interconnecting means when the driven conveyer is driven by said driving means, said means for driving said driven conveyer continuously comprising an element rotatable in unison with the means which drives said knife and change speed mechanism arranged between said element and said driven conveyer to selectively drive said conveyers in unison at different speeds to cut slices of different thicknesses without changing the rotation of movement of said knife.

13. In a slicing machine, the combination with a substance supporting conveyor having an endless supporting surface movable in only one direction, a slicing knife carried by a rotatable element and eccentrically mounted on said rotatable element, said knife rotated about its own axis as well as the axis of said rotatable element, power means for driving said rotatable element at a high rate of speed, a second conveyor having an endless supporting surface movable in one direction only, whereby the substance and slices can be fed and carried without interruption, said second conveyor arranged in a position to receive slices directly as they are formed by said knife and movable in a direction away from the cutting plane of said knife so that the slices will be received in overlapping relation with each other, means associated with said knife for directing the slices onto said second conveyor with the broad sides facing downwardly, means for driving one of said conveyors, and interconnecting driving means between the two conveyors and driving the other of said conveyors through said driven conveyor synchronously therewith when the driven conveyor is driven by said first-named driving means.

ARTHUR H. AHRNDT.